(12) United States Patent
Miettinen

(10) Patent No.: US 7,271,505 B1
(45) Date of Patent: Sep. 18, 2007

(54) VOLTAGE BALANCING IN INTERMEDIATE CIRCUIT CAPACITORS

(75) Inventor: Erkki Miettinen, Helsinki (FI)

(73) Assignee: Abb Oy, Helsinki (FI)

( * ) Notice: Subject to any disclaimer, the term of this patent is extended or adjusted under 35 U.S.C. 154(b) by 1138 days.

(21) Appl. No.: 10/069,134

(22) PCT Filed: Sep. 21, 2000

(86) PCT No.: PCT/FI00/00806

§ 371 (c)(1),
(2), (4) Date: May 6, 2002

(87) PCT Pub. No.: WO01/22554

PCT Pub. Date: Mar. 29, 2001

(30) Foreign Application Priority Data

Sep. 22, 1999 (FI) .................................. 19992031

(51) Int. Cl.
*H02J 7/34* (2006.01)

(52) U.S. Cl. ........................ 307/110; 320/119; 320/166

(58) Field of Classification Search ................ 307/110; 320/119, 166
See application file for complete search history.

(56) References Cited

U.S. PATENT DOCUMENTS

| | | | | |
|---|---|---|---|---|
| 4,062,057 A | * | 12/1977 | Perkins et al. | 363/71 |
| 4,313,155 A | * | 1/1982 | Bock et al. | 363/21.08 |
| 4,685,039 A | * | 8/1987 | Inou et al. | 363/16 |

FOREIGN PATENT DOCUMENTS

| | | | |
|---|---|---|---|
| DE | 2819676 A | * | 12/1979 |
| DE | 197 08 842 | | 9/1998 |
| EP | 0 911 950 | | 4/1999 |
| WO | WO97/16897 | | 5/1997 |

* cited by examiner

*Primary Examiner*—Brian Sircus
*Assistant Examiner*—Brett Squires
(74) *Attorney, Agent, or Firm*—Dykema Gossett PLLC

(57) ABSTRACT

A balancing circuit for voltages of a series connection of capacitors, particularly for intermediate circuit capacitors (3) of an inverter, there being at least two intermediate circuit capacitors connected in series over intermediate circuit voltage. The balancing circuit comprises capacitor-specific freely oscillating inverters (4), the input poles of which are connected in parallel with the capacitor corresponding to the inverter and the output poles of which are connected in parallel to provide a voltage source (Va).

2 Claims, 2 Drawing Sheets

US 7,271,505 B1

VOLTAGE BALANCING IN INTERMEDIATE CIRCUIT CAPACITORS

BACKGROUND OF THE INVENTION

The invention relates to a balancing circuit for voltages of a series connection of capacitors, particularly for intermediate circuit capacitors of a frequency converter, there being at least two intermediate circuit capacitors connected in series over intermediate circuit voltage.

Series-connected electrolyte capacitors are usually used as the energy reserve of the DC side in frequency converters. The number of capacitors to be connected in series depends on the supply voltage of the frequency converter, being usually one capacitor for 230 volts, two for 400 to 500 volts, three for 690 volts and four for 1000 volts. Series connections of capacitors can also be connected in parallel in an intermediate circuit. The number of parallel connections depends on the output current of the frequency converter.

The leakage currents of capacitors typically differ from one another, which means that the supply voltage of the static state acting over the series connection is not divided evenly between the capacitors. This may result in a situation where a single capacitor is subjected to a voltage which exceeds the allowed limit in the dynamic state due to the influence of current ripple and capacitance tolerances, for example. For this reason, 'balancing resistors' are usually connected in parallel with the capacitors, the current flowing through the resistors being much higher than the leakage current of the capacitors. In that case the voltage distribution in the static state is mainly determined by the resistance ratios of the resistors. It is also known in the art to use active components in addition to the resistors, e.g. emitter follower connections, which provide stricter restriction without an unreasonable increase in the power loss. However, the use of active components increases the component costs.

Typical balancing resistance for one capacitor in a frequency converter of 100 kVA is 22 kilo ohms, its power dissipation being 5.2 watts with 500 volts, for example. Since with this voltage there are two capacitors and resistors in series, the total power dissipation is 10.4 watts. With higher voltages the power dissipation is naturally even greater.

To operate the frequency converter needs a certain amount of auxiliary power for control circuits and gate drivers. This power is typically 10 to 20 watts in the case of a frequency converter of 100 kVA. It is easy to note that the amount of waste heat produced in the balancing resistors is nearly equal to the amount of auxiliary power needed by the whole frequency converter. Thus it would be highly advantageous if the power dissipation required by balancing of capacitors could be utilized as the auxiliary power of the device.

BRIEF DESCRIPTION OF THE INVENTION

An object of the invention is to provide a circuit which allows to avoid the above-mentioned drawbacks and to balance voltages of a series connection of capacitors in a reliable manner so that an auxiliary voltage source is formed during voltage balancing. This object is achieved with a circuit according to the invention which is characterized in that the balancing circuit comprises capacitor-specific freely oscillating inverters, the input poles of which are connected in parallel with the capacitor corresponding to the inverter and the output poles of which are connected in parallel to provide a voltage source.

The circuit according to the invention is based on the idea that freely oscillating inverter circuits are used for balancing the voltages of series-connected capacitors, the inverter circuits converting voltage supply into voltage to be used in other circuits during voltage balancing. The circuit according to the invention provides the advantage that the power that would otherwise be lost can be utilized in low-power circuits, e.g. as auxiliary voltage in the control circuits and gate drivers of a frequency converter.

BRIEF DESCRIPTION OF THE DRAWINGS

The invention will be described in greater detail by means of preferred embodiments with reference to the accompanying drawings, in which.

DETAILED DESCRIPTION OF THE INVENTION

Figure 1:
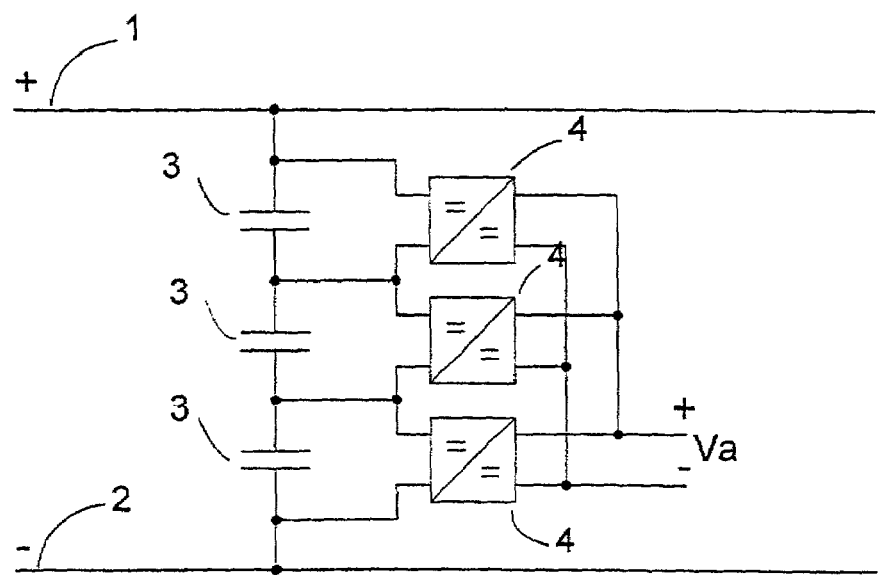
FIG. 1 illustrates a balancing circuit for voltages of a series connection of capacitors according to the invention.

FIG. 1 illustrates a balancing circuit for voltages of a series connection of capacitors according to the invention. The capacitors of FIG. 1 are illustrated as capacitors of the intermediate circuit of a frequency converter but the circuit according to the invention can also be utilized in any other applications of the series connection of capacitors. The intermediate circuit of the frequency converter shown in the figure comprises a positive 1 and a negative 2 voltage busbar, between which there are three capacitors 3 connected in series. FIG. 1 does not illustrate the actual inverter part of the frequency converter, i.e. power semiconductors and their control circuits because these components are irrelevant to the application and understanding of the invention.

Figure 2:
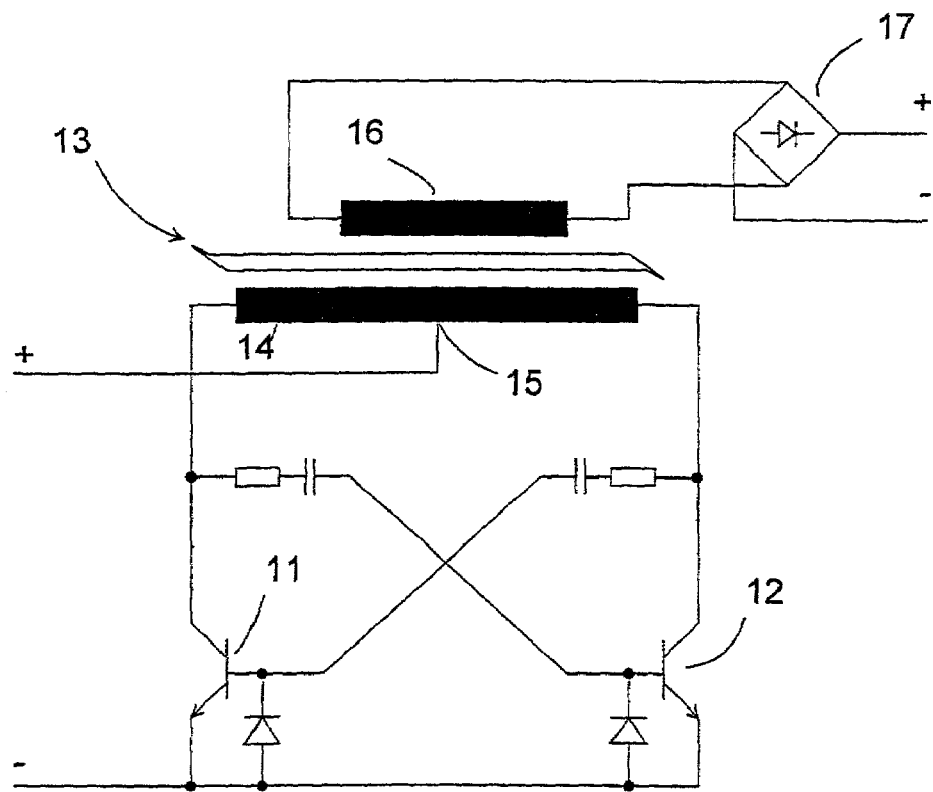
FIGS. 2 and 3 illustrate inverters used for balancing voltages of capacitors according to the invention.
Figure 3:
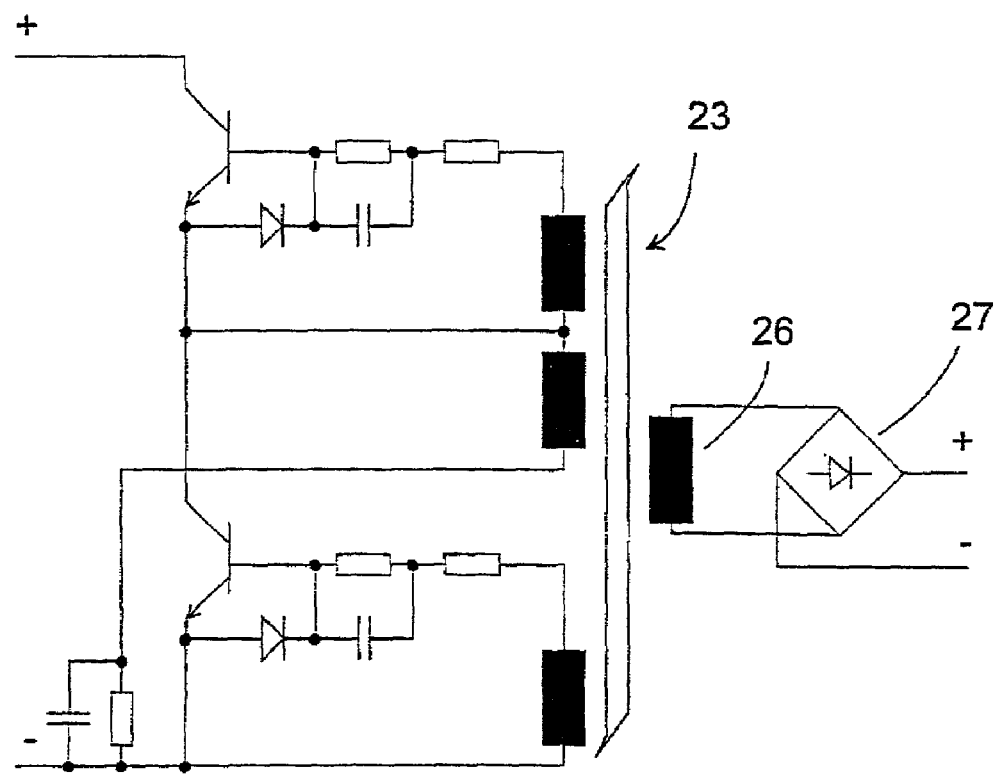

According to the invention, a freely oscillating inverter 4 is connected to the poles of each series-connected capacitor. Examples of freely oscillating inverters are shown in FIGS. 2 and 3. According to FIG. 1, the freely oscillating inverters are connected so that each series-connected capacitor comprises an inverter of its own. Thus the positive pole of each inverter is connected to the positive pole of the respective capacitor and the negative pole to the negative pole of the respective capacitor.

Using the circuit according to the invention the voltage of the electrolyte capacitors functioning as the power reserve of an intermediate circuit in a frequency converter can be balanced so that the auxiliary power needed by the frequency converter is generated at the same time. A freely oscillating inverter formed by two transistors 11, 12 and a converter 13 is connected in parallel with each capacitor, the centre 15 of the primary coil 14 of the converter being connected to the positive pole of the capacitor and the free ends of the same coil to the collectors of the transistors. This kind of embodiment of the invention is shown in FIG. 2. Still referring to FIG. 2, the emitters of the transistors 11, 12 are connected to the negative pole of the capacitor and the bases as well as a few passive components to the control coil of the converter according to the prior art to form a self-oscillating inverter. The self-oscillating inverter generally refers to the fact that no separate control circuits or timing circuits are used for controlling the semiconductor switches of inverter of this kind. Using passive components it is possible to provide an inverter in which there is no need for separate control power because the semiconductors conduct alternately thanks to oscillation.

In the self-oscillating inverter alternating voltage is induced in the secondary coil 16; 26 of the converter 13;23, which is rectified with a rectifying bridge 17; 27 to provide a direct current that can be used as the auxiliary voltage. The full-wave rectified outputs of all inverters are connected together as shown in FIG. 1 to provide an intermediate voltage Va, e.g. 24 V±30%, which is suitable for supply of auxiliary power. The number of turns of the secondary coil of the converters in the inverters is adjusted with respect to the primary coil so that this voltage is achieved with a typical terminal voltage of the energy reserve capacitor. It is clear that large tolerances should be allowed for this intermediate auxiliary voltage because the range of variation of the primary voltage is also large.

Depending on the inverter solution used, the transistors of the inverter should withstand a voltage which is 1.2 or 2 times the capacitor voltage, which in the worst case, i.e. with a mains voltage of 500 volts and an overvoltage of 30%, is 878 volts. Thus it is possible to select transistors intended for a collector voltage of 1000 volts, in which case the inverter circuit is at its simplest (FIG. 2), or transistors of 600 volts, in which case a few additional components are needed for the circuit (FIG. 3).

The output and input voltages of the inverter circuit shown follow each other when multiplied by the transformation ratio of the converter, i.e. if the input voltage increases, rectified output voltage also increases accordingly. The influence of any unideal properties of the inverter on this dependency is typically very small.

Since the rectified outputs of the converters are connected together as shown above so that they retain their polarity, the auxiliary voltage power flows mainly through the converter with the higher secondary voltage. This means that most of the auxiliary voltage power is taken from the energy reserve capacitor the terminal voltage of which tends to be the highest with respect to the other series-connected capacitors. Thus energy flows out of the capacitor, which means that the terminal voltage of the capacitor decreases until it reaches the second highest terminal voltage. However, this interaction occurs simultaneously between all capacitors, and consequently the terminal voltages will be equal and the supply of auxiliary power is divided almost evenly between the inverters.

This solution provides active balancing of energy reserve capacitors with virtually no loss of power, while the circuit can be used for supplying auxiliary voltage, e.g. in connection with a frequency converter.

An additional advantage of the invention is that the components of the inverters are not dependent on the mains voltage. In all cases the number of series-connected inverters comprising the same components increases along with the input voltage, and thus expensive high-voltage switch components are not needed even with high supply voltages, which is the case in solutions based on separate auxiliary current sources driven directly by the intermediate circuit voltage. If the supply voltage is around 1000 volts, standard switch components are not even available.

The output power of frequency converters tends to be higher when the supply voltage is high. In that case one needs more auxiliary power because the number of gate drivers is larger, but thanks to several series-connected intermediate circuit capacitors, a corresponding number of inverters the secondary circuits of which are connected in parallel are available for this purpose.

The inverter and its secondary rectifier used in the circuit according to the invention can be implemented easily using a piece of a circuit board, or as a unit cast in epoxy, which, being a low-loss unit, is easy to connect directly to the poles of a power capacitor. The price of such a volume component can be reduced considerably, and, if necessary, the converters can be provided with reinforced insulation, in which case the intermediate voltage of the auxiliary power can be rendered to the earth potential to enable parallel battery use when the intermediate circuit voltage has not been switched on or it is too low with respect to the normal operation. It is also easy to implement a blocking circuit for accidental start-up in the earth potential.

It is obvious to a person skilled in the art that the inventive concept can be implemented in various ways. The invention and its embodiments are thus not limited to the examples described above, but they may vary within the scope of the claims.

The invention claimed is:

1. A balancing circuit for voltages of a series connection of capacitors of an inverter, there being at least two intermediate circuit capacitors connected in series over intermediate circuit voltage, wherein the balancing circuit comprises capacitor-specific freely oscillating inverters, the input poles of which are connected in parallel with the capacitor corresponding to the inverter and the output poles of which are connected in parallel to provide a voltage source (Va), said capacitor specific freely oscillating inverters being adapted to balance the voltages of the capacitor supplied by access to energy stored therein to thereby provide voltage to the output.

2. In an inverter having at least two series connected intermediate circuit capacitors, a balancing circuit comprising:
a freely oscillating inverter for each intermediate circuit capacitor having input poles and output poles, the input poles coupled across the corresponding capacitors and the output poles being connected together in parallel for providing a voltage source, the freely oscillating inverter being adapted to balance the voltages of the capacitor supplied by access to energy stored therein to thereby provide voltage to the output.

* * * * *